US011933625B2

(12) United States Patent
Patnaikuni et al.

(10) Patent No.: US 11,933,625 B2
(45) Date of Patent: Mar. 19, 2024

(54) MANAGING NAVIGATION INTERFACE DISPLAY (71) Applicant: International Business Machines Corporation, Armonk, NY (US)

(72) Inventors: Subha Kiran Patnaikuni, Visakhapatnam (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 17/030,426

(22) Filed: Sep. 24, 2020

(65) Prior Publication Data

US 2022/0090932 A1 Mar. 24, 2022

(51) Int. Cl.
G01C 21/36 (2006.01)
G01S 19/42 (2010.01)
G06F 3/04842 (2022.01)
F04B 43/04 (2006.01)

(52) U.S. Cl.
CPC ..... G01C 21/3626 (2013.01); G01C 21/3617 (2013.01); G01S 19/42 (2013.01); G06F 3/04842 (2013.01); F04B 43/043 (2013.01); G01C 21/3614 (2013.01)

(58) Field of Classification Search
None
See application file for complete search history.

(56) References Cited

U.S. PATENT DOCUMENTS

| 7,999,937 | B1 * | 8/2011 | Srivastava | B01L 3/502761 356/338 |
| 2006/0232611 | A1 | 10/2006 | Brooke | |
| 2015/0170515 | A1 * | 6/2015 | Annapureddy | G01C 21/3492 701/482 |
| 2016/0048304 | A1 | 2/2016 | Niranjani | |
| 2018/0299973 | A1 | 10/2018 | Kim | |
| 2019/0174862 | A1 * | 6/2019 | Rakshit | G06F 3/016 |
| 2020/0033154 | A1 * | 1/2020 | Chung | H04N 23/80 |

(Continued)

FOREIGN PATENT DOCUMENTS

JP 4231898 B1 * 10/2008

OTHER PUBLICATIONS

Sano Shunsuke et al JP4231898B1 (translated), 2008 (Year: 2008).*

(Continued)

*Primary Examiner* — Hongye Liang
(74) *Attorney, Agent, or Firm* — David B. Woycechowsky (57) ABSTRACT

Embodiments of the present invention provide a computer system a computer program product, and a method that comprises identifying multiple contextual factors within a navigational data based on navigational data containing a plurality of indicative markers, wherein the multiple contextual factors have an impact on a size of the navigational data associated with a navigational path; classifying the identified multiple contextual factors according to a contextual analysis of portions of the navigational path; and generating a microfluidic-based spiral representation of the navigational path for a user interface within a computing device based on a classification of the identified multiple contextual factors associated with the navigational data.

3 Claims, 6 Drawing Sheets

(56) References Cited

U.S. PATENT DOCUMENTS

2021/0356288 A1* 11/2021 Hajj .................. G01C 21/3423

OTHER PUBLICATIONS

Johnston, Casey, "Microfluidics panel could add physical buttons to a touch screen", Jan. 23, 2014, 4 pages, <https://arstechnica.com/gadgets/2014/01/new-microfluidics-panel-could-add-physical-buttons-to-a-touch-screen/>.

Vanhemert, Kyle, "This iPad Case Makes Real Buttons Rise Out of Your Keyboard", Feb. 12, 2015, 10 pages, <https://www.wired.com/2015/02/ipad-case-makes-buttons-magically-rise-keyboard/>.

* cited by examiner

MANAGING NAVIGATION INTERFACE DISPLAY

BACKGROUND

The present invention relates generally to the field of navigational technology, and more specifically navigational technology within a smart device.

Global positioning system ("GPS") is a satellite-based navigation system. This global navigation satellite systems provides geolocation and time information to a GPS receiver anywhere on or near the Earth where there is an unobstructed line of sight to four or more GPS satellites. Obstacles such as mountains and buildings block the relatively weak GPS signals. The GPS does not require the user to transmit any data, and it operates independently of any telephonic or interne reception, though these technologies can enhance the usefulness of the GPS positioning information. The GPS provides critical positioning capabilities to military, civil, and commercial users around the world.

Navigation is a field of study that focuses on the process of monitoring and controlling the movement of a craft or vehicle from one place to another. The field of navigation includes four general categories: land navigation, marine navigation, aeronautic navigation, and space navigation. It is also the term of are used for specialized knowledge used by navigators to perform navigation tasks. All navigational techniques involve locating the navigator's position compared to known locations or patterns. Navigation, in a border sense, can refer to any skill or study that involves the determination of position and direction. In this sense, navigation includes orienteering and pedestrian navigation.

A smart device is an electronic device, generally connected to other devices or networks via different wireless protocols that can operate to some extent interactively and autonomously. Several notable types of smart devices are smartphones, smart cars, smart thermostats, smart doorbells, smart locks, smart refrigerators, phablets and tablets, smartwatches, smart bands, smart key chains, smart speakers and others. The term can also refer to a device that exhibits some properties of ubiquitous computing, including—although not necessarily—artificial intelligence. Smart devices can be designed to support a variety of form factors, a range of properties pertaining to ubiquitous computing and to be used in three main systems environments: physical world, human-centered environments and distributed computing environments.

SUMMARY

Embodiments of the present invention provide a computer system a computer program product, and a method that comprises identifying multiple contextual factors within a navigational data based on navigational data containing a plurality of indicative markers, wherein the multiple contextual factors have an impact on a size of the navigational data associated with a navigational path; classifying the identified multiple contextual factors according to a contextual analysis of portions of the navigational path; and generating a microfluidic-based spiral representation of the navigational path for a user interface within a computing device based on a classification of the identified multiple contextual factors associated with the navigational data.

DETAILED DESCRIPTION

Embodiments of the present invention recognize the need for an improvement to current navigational technology systems within smart devices, specifically smart watch devices by allowing a user to precisely select any point from a zoomed-out navigational display. Currently, navigational technology on a smartwatch have a small display dimension; and if the user zooms in on the provided navigational display, then the navigational information will not be visible. Also, if the user attempts to zoom out of the navigational display on the smartwatch, the display dimension will be to unreadable due to how small information will appear. Embodiments of the present invention provide this improvement by generating a microfluidics based spiral representation of the navigational display, which dynamically adjusts in response to an analysis and classification of the navigational path. Embodiments of the present invention generates a dynamic replication of the physical appearance of the navigational path associated with directional data requested by a user using the microfluidics layer placed on a top surface of the smartwatch. This dynamic replication of the physical appearance allows the user to see the entire portion of the navigational path, while simultaneously allowing the user to focus a specific portion of the navigational path. Furthermore, this dynamic replication of the navigational path's physical appearance allows a visually impaired user to feel conditions of the navigational path associated with a respective direction.

Figure 1:
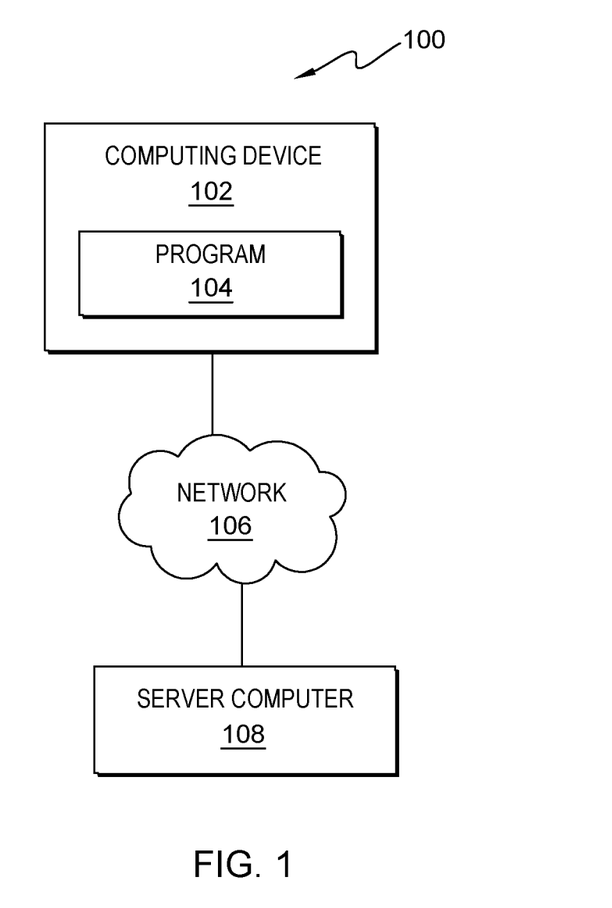
FIG. 1 is a functional block diagram depicting an environment with a computing device connected to or in communication with another computing device, in accordance with at least one embodiment of the present invention.

FIG. 1 is a functional block diagram of a computing environment 100 in accordance with an embodiment of the present invention. The computing environment 100 includes a computing device 102 and a server computing device 108. The computing device 102 and the server computing device 108 may be desktop computers, laptop computers, specialized computer servers, smart phones, wearable technology, or any other computing devices known in the art. In certain embodiments, the computing device 102 and the server computing device 108 may represent computing devices utilizing multiple computers or components to act as a single pool of seamless resources when accessed through a network 106. Generally, the computing device 102 and the server computing device 108 may be representative of any electronic devices, or a combination of electronic devices, capable of executing machine-readable program instructions, as described in greater detail with regard to FIG. 6.

The computing device 102 may include a program 104. The program 104 may be a stand-alone program on the computing device 102. In another embodiment, the program 104 may be stored on a server computing device 108. In this embodiment, the program 104 generates a spiral representation of a navigational path using a microfluidic layer on the surface of a smart computing device 102 that allows a user to touch and feel classifications of the navigational path. Embodiments of the present invention recognize that such a display may be beneficial for visually impaired users or users unable to or prefer not to use traditional navigation displays for a computing device 102 having a limited display area (e.g., a smart watch). In this embodiment, the program 104 generates the spiral representation of the navigational path by receiving input from a user in the form of a request for navigational directions using a global positioning system algorithm. In this embodiment, the program 104 identifies factors of the navigational data by analyzing the length of the data, length of the route, duration of the route, and number of pages needed to display the data. In this embodiment, the program 104 classifies the navigational data by comparing the identified factors of the navigational data to a historical baseline of navigational data received from the user over a fixed amount of time. In this embodiment, the program 104 displays the navigational data using a microfluidics-based spiral on a top surface of the smartwatch, which allows the user to feel for differences in the classification of the navigational data.

The network 106 can be a local area network ("LAN"), a wide area network ("WAN") such as the Internet, or a combination of the two; and it may include wired, wireless or fiber optic connections. Generally, the network 106 can be any combination of connections and protocols that will support communication between the computing device 102 and the server computing device 108, specifically the program 104 in accordance with a desired embodiment of the invention.

The server computing device 108 may include the program 104 and may communicate with the computing device 102 via the network 106.

Figure 2:
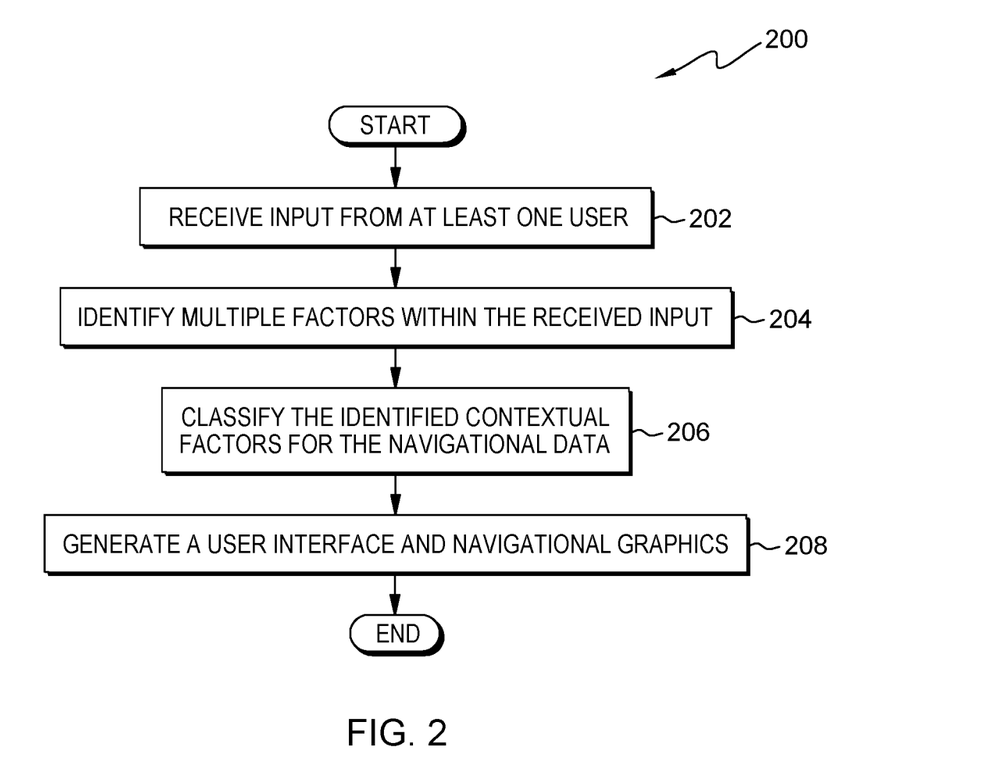
FIG. 2 is a flowchart illustrating operational steps for generating a microfluidics based spiral representation of a navigation path, in accordance with at least one embodiment of the present invention.

FIG. 2 is a flowchart 200 illustrating operational steps for generating a microfluidics based spiral representation of a navigation path, in accordance with at least one embodiment of the present invention.

In step 202, the program 104 receives input from at least one user. In this embodiment, the program 104 receives input from at least one user, and the received input is a request of navigational data between two specific points of location. In this embodiment, the program 104 receives input from at least one user in the form of navigational data using the global positioning system algorithm. In this embodiment, the navigational data contains a plurality of indicative markers associated with a navigational path. In this embodiment, navigational data is defined as point-by-point directions. For example, the program 104 receives a user's request for directions from Cairo, Egypt to Warsaw, Poland.

In step 204, the program 104 identifies multiple contextual factors within the received input. In this embodiment, the program 104 identifies multiple contextual factors associated with the navigational data within the received input by analyzing the navigational data for indicative markers that indicate the length, duration, and type of navigation needed to navigate a user from one point to another point using a navigational determination engine. In this embodiment, the program 104 defines contextual factors as factors that have an impact on the size of the navigational data. In this embodiment, the program 104 identifies contextual factors as mileage of the navigational path, time to traverse the navigational path, method of travel associated with the navigational path, profile of the navigational path, and any impediments that may increase or decrease the size of the navigational data associated with the navigational path. In this embodiment, the program 104 determines that the size of the navigational data associated with the navigational path exceeds the limited display capacity of the computing device 102 based on the identified contextual factors associated with the navigational path. For example, the program 104 identifies the distance from Cairo, Egypt to Warsaw, Poland is 4,748.3 kilometers, the duration is 53 hours with uneven surfaces in places, sharp turns in places, and constructions in places; and these identified factors increase the size of the navigational data that exceeds the limited display capability of the smart watch, which cannot show each location of the identified factors of the navigational path.

In step 206, the program 104 classifies the identified contextual factors for the navigational data within the received input. In this embodiment, the program 104 classifies the navigational data by analyzing the identified contextual factors associated with the navigational data. In this embodiment, the program 104 performs a contextual analysis of the identified context factors associated with the navigational data by identifying portions of the navigational path using GPS algorithms and crowdsourcing information from an online database that houses reviews and remarks from other individuals regarding the identified portions of the navigational path. In this embodiment, the identified portions are stretches of navigation that require more time to cross than it should compared to a historical baseline associate with the navigational path. Thus, examples of these factors include traffic, construction, narrow roads, bad road (i.e., potholes), strong current, headwind, etc. These identified portions may be of different lengths and measured using different units of measurement respective to the classification of navigational path. For example, a land navigational path may be measured in kilometers, which a marine navigational path may be measured in fathoms. In this embodiment and in response to performing the contextual analysis of the identified contextual factors associated with the navigational data, the program 104 verifies the classification of the identified contextual factors associated with the navigational data by comparing the identified contextual factor to a historical baseline of navigational data.

In instances where there is no existing historical baseline, the program 104 can generate the historical baseline of navigational data by compiling requests for navigational data from the respective user over a predetermined amount of time. In this embodiment, the program 104 generates the historical baseline of navigational data by performing a query on the navigational path requested by the user. In this embodiment and in response to comparing the identified contextual factors to the historical baseline, the program 104 classifies a condition of the navigational path, in whole or in part. For example, the program 104 classifies the specific portions of the navigational path from Cairo, Egypt to Warsaw, Poland as bad road based on a crowdsourcing result of previous accidents and GPS algorithms identifying traffic as a result of construction to the navigational path.

In step 208, the program 104 generates a user interface and navigational graphics. In this embodiment, the program 104 generates a user interface and navigational graphics that are dynamically displayed on a top surface of a smart device, specifically a smart watch. In this embodiment, the program 104 generates the user interface and navigational graphics by generating microfluidics spiral based layer on the top surface of a smartwatch. In this embodiment, the microfluidics spiral based layer located on the top surface allows the user to determine lengths of the navigational path that would be too large or too small to be displayed on the surface of the smart device. In this embodiment, the program 104 generates navigational graphics using the spiral microfluidics layer by determining a length of navigation associated with the navigational path; tracking a user's location relative to the navigational path using the generated navigational graphics; determining difficulty for a reminder of the navigational path relative to the tracked located of the user; and modifying a generated spiral display of the navigational path based on determined difficulty associated with the remainder of the navigational path. This step will be further explained in FIG. 3.

In another embodiment, the program 104 dynamically displays a physical appearance of the path associated with the navigational data on the smartwatch by converting the navigational data into a raised imprint to represent profiles of the road such as multiple turns, narrow roads, and traffic conditions. For example, the program 104 displays the path from Cairo, Egypt to Warsaw, Poland as a microfluidics based spiral navigational path with the number of spirals indicating the length of distance for the navigational path and breaks in the spiral indicate bad road conditions located on the navigational path. In this embodiment and in response to the user traversing the navigational path, the program 104 adjusts the generated display to correspond to the amount of the navigational path traversed by the user.

In another embodiment, the program 104 controls media content using the generated microfluidic layer. In this embodiment, the program 104 generates a microfluidics based spiral progress bar displayed on the computing device 102. In this embodiment, the program 104 creates abrasions on the microfluidic surface layer, which allows a user to touch and feel media content and change the current media content using generated microfluidic layer. For example, the user is playing a song file of 60 minutes, having multiple songs; and the generated microfluidics based spiral progress bar displays the progress of each song that can be touched and felt by a user, which also displaying the totality of the remaining song file.

Figure 3:
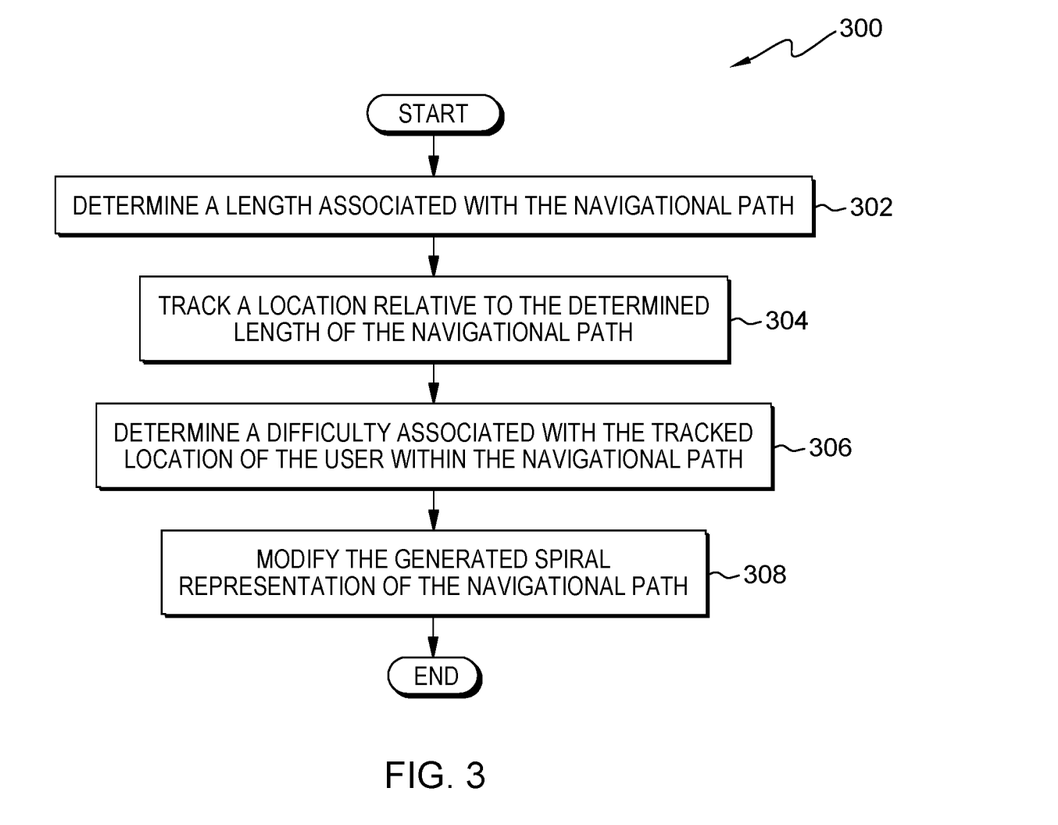
FIG. 3 is a flowchart illustrating operational steps for generating a navigational display using a microfluidic layer, in accordance with at least one embodiment of the present invention.

FIG. 3 is a flowchart 300 illustrating operational steps for generating a navigational display using a microfluidic layer, in accordance with at least one embodiment of the present invention.

In step 302, the program 104 determines a length associated with the navigational path. In this embodiment, the program 104 determines the complete length of the navigational path that is displayed on the smart watch within a spiral path. In this embodiment, the program 104 determines the complete length of the navigational path by using GPS algorithms to calculate a total distance between at least two points. In this embodiment, the program 104 defines the spiral path as a representation of the complete navigational path for the user. For example, user is on a navigational path with a complete length of 400 kilometers ("km") and the smartwatch displays only 50 km of the 400 km complete length in a spiral display, which allows the user, who is visually impaired, to determine a relative position with respect to the complete length of the navigational path.

In another embodiment and in response to the smart device not being able to display the determined length of the navigational path, the program 104 generates a spiral display by converting the determined length of the navigational path into a spiral representation of the navigational path, where the length of the navigational path is proportional to the number of spirals present in the spiral representation of the navigational path. For example, a user is having difficulty selecting a precise location within the navigational path on the smartwatch. In this embodiment, the program 104 generates the spiral display using a microfluidics enabled system, where the microfluidics systems raise a surface of the smart device for the user to touch and feel the spiral representation of the navigational path. In this embodiment, the program 104 removes the spiral representation of the navigational path in response to the user zooming in or focusing on a specific location of the navigational path due to the smart device being able to display that portion of the navigational path.

In step 304, the program 104 tracks a location relative to the determined length of the navigational path. In this embodiment, the program 104 tracks a user's location relative to the complete length of the navigational path by locating a user's position at a first period of time and locating the user's position at a second period of time using GPS algorithms and artificial intelligence algorithms, where the second period of time is subsequent to the first period of time. For example, the program 104 tracks the user's location between Bangalore, India and Kolkata, India.

In step 306, the program 104 determines a difficulty associated with the tracked location of the user within the navigational path. In this embodiment, the program 104 determines the difficulty associated with the tracked location within the navigational path by classifying portions of the navigational path based on multiple factors. In this embodiment, the program 104 classifies portions of the navigational path by analyzing the navigational path using GPS algorithms and crowdsourcing information, comparing the analysis of the navigational path to a generated historical baseline associated with identified portions of the navigational path, and verifying the comparison using GPS algorithms and artificial intelligence algorithms. In this embodiment, the program 104 verifies the comparison of the navigational path by determining a difference in time it would take a user to traverse the navigational path in the absence of the classified portions and in the presence of the classified portions.

In another embodiment and in response to tracking a location relative to the complete determined length associated with the navigational path, the program 104 anticipates a portion of the complete determined length associated with the navigational path based on the tracked locations of the user and determines a difficulty associated with the anticipated portion of the navigational path based on the classification of identified contextual factors associated with the navigational path.

In this embodiment, the program 104 defines difficulty associated with the navigational path as an impediment for a user to complete the navigational path. In this embodiment, the program 104 determines a difficulty by assigning weight values for identified factors (e.g., bad road equals +2, narrow road equals +1, construction +4, and mud slide +10 etc.) associated with the navigational path and generating an overall difficulty score by summing those assigned weight values for the navigational path. In this embodiment, the program 104 defines bad road as a portion of road that has an uneven surface, and this may be due to potholes, corrosion over time, or constructions in which case the portion of bad road is quantified as construction receiving a +4 rather than the +2 customarily assigned to bad road. In this embodiment, the program 104 analyzes the crowdsourced information associated with the portion of the navigational path for mentions of uneven surface using a machine learning algorithm and artificial intelligence algorithms. In this embodiment, the program 104 performs a crowdsourced query of information associated with a subset of identified portions associated with the navigational path. In this embodiment and in response to the analysis of the crowdsourced information, the program 104 verifies the presence of the uneven surfaces by identifying the portions of the navigational path with satellite imaging using GPS algorithms. This is because additional impediments that accompany road construction, outside of the uneven road, such as the construction crew, nails and other miscellaneous debris that are needed to complete the construction. For example, the program 104 classifies profile of the road, condition of the road, and traffic as difficulties associated with the navigational path from Bangalore, India to Kolkata, India.

In another embodiment and in response to determining a difficulty associated with the remainder of the navigational path, the program 104 inputs the classified content of the navigational path into the generated spiral representation of the navigational path. In this embodiment, the program 104 raises the microfluidic surface on the smartwatch of the generated spiral representation of the navigational path in response to identified classified content on the remainder of the navigational path. In this embodiment, the program 104 allows a user to feel and touch the classified content of the navigational path through the microfluidic surface. This step will be further explained in FIG. 4. For example, the user feels a gap between the generated spiral display that is two links of the spiral representation of the navigational path, thus indicating to the user that there is upcoming bad road based on the +2 assigned weight. In another example, the user feels a gap between the generated spiral display that is five links of the spiral representation of the navigational path, thus indicating to the user that there is upcoming constructions based on the +5 assigned weight.

In step 308, the program 104 modifies the generated spiral representation of the navigational path based on the determined difficulty associated with the remainder of the navigational path. In this embodiment, the program 104 implements the determined difficulties into the generated spiral representation of the navigational path. In this embodiment, the program 104 modifies generated spiral representation of the navigational path by analyzing the navigational path for determined difficulties, gathering additional information associated with the navigational path using crowdsourcing, and updating the generated spiral representation with an appropriate simulation of road condition by controlling microfluidics values within the smart device. In this embodiment, the program 104 analyzes the navigational path for determined difficulties using GPS algorithms. For example, the program 104 modifies the generated spiral representation by placing interruptions in the microfluidics surface to represent bad road and narrowing the generated spiral representation to represent narrow roads.

Figure 4:
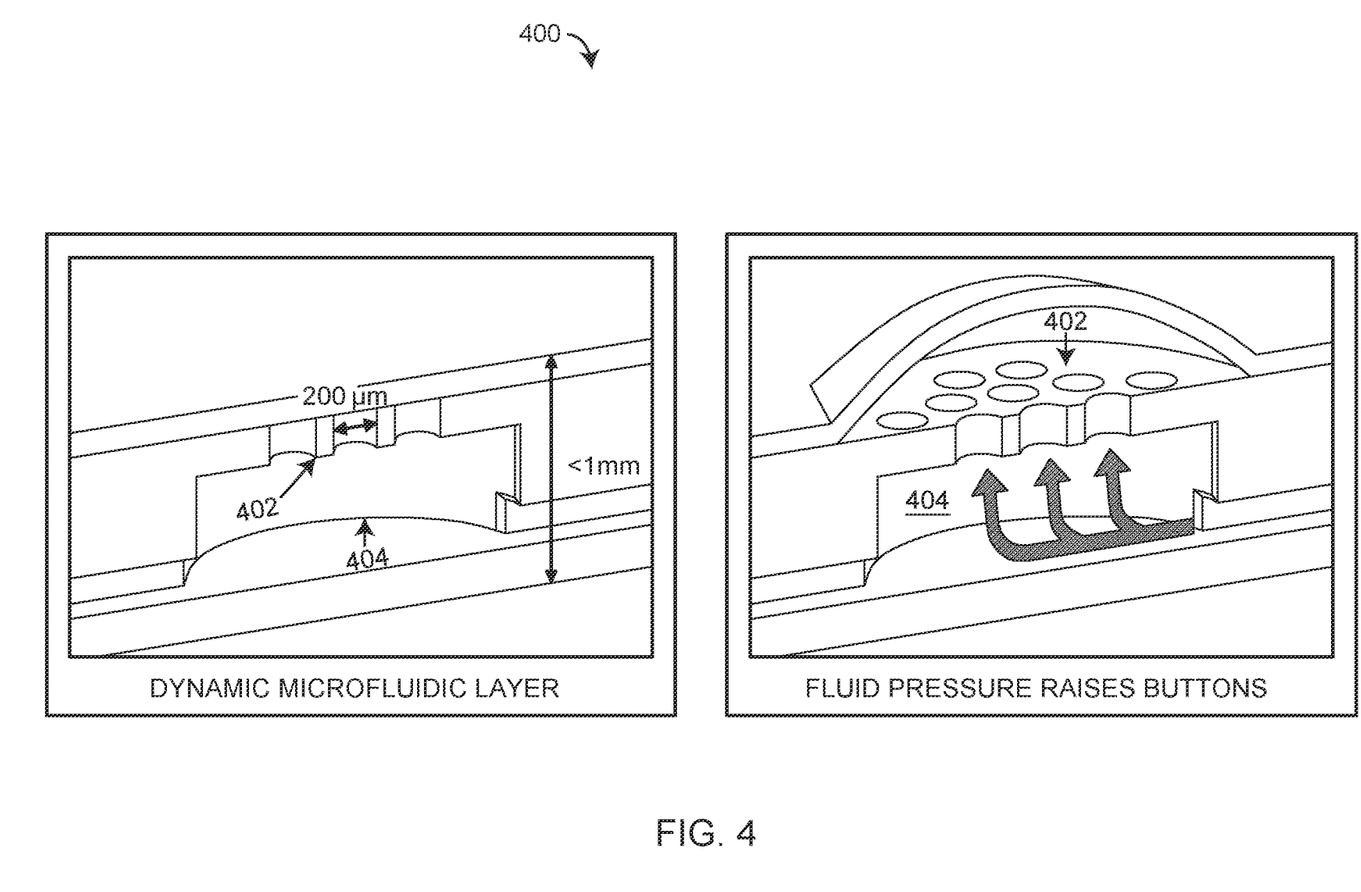
FIG. 4 is an exemplary figure illustrating the functionality of a dynamic microfluidic layer, in accordance with at least one embodiment of the present invention.

FIG. 4 is an exemplary FIG. 400 illustrating the functionality of a dynamic microfluidic surface layer within the computing device 102.

In this embodiment, the program 104 raises the surface of the computing device 102 by controlling an amount of fluid required to create an abrasion on the surface. In this embodiment, the program 104 raises the microfluidic surface of the smartwatch using at least one valve 402 and at least one pump 404. In this embodiment, the valve 402 has a diameter of 200 micrometers and is made of a material capable of withstanding a pressurized fluid traveling through the value 402. In this embodiment, the pump 404 has an area of 1 millimeter and is made of a material capable of withstanding a pressurized fluid traveling into the area of the pump 404. In this embodiment, the program 104 powers the pressurizing of fluid through the pump 404 by using the battery of the computing device 102. For example, the program 104 uses the battery of the smart watch to push fluid through the pump 404 into the valve 402 to raise the microfluidic layer. In this embodiment, the program 104 defines the microfluidics layer as a transparent layer covering a display surface of the computing device 102 that uses fluids to raise specific sections of the layer allowing the user to touch and feel the display. In another embodiment, the program 104 transmits instructions to a microprocessor located with the computing device 102 that controls the pump 404 and valve 402 of the microfluidic layer that raises specific portions of the layer, thus creating abrasions in the layer.

Figure 5:
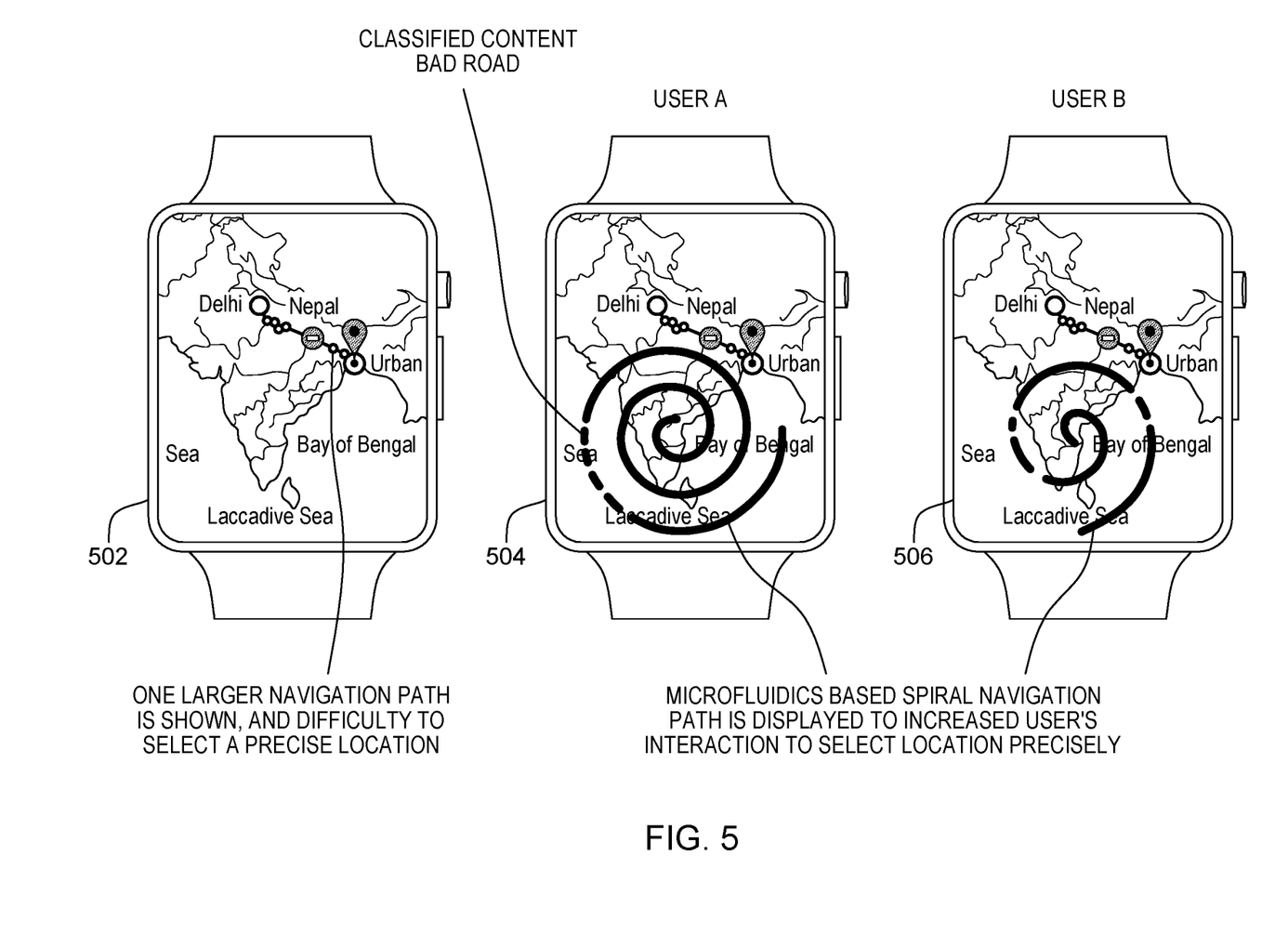
FIG. 5 is exemplary figure illustrating a spiral representation of a navigational path, in accordance with at least one embodiment of the present invention.

FIG. 5 depicts examples of a generated spiral representation of a navigational path, in accordance with an embodiment of the present invention. Display 502 displays a navigational path from Delhi, India to Urban, India. In this embodiment, display 502 does not display a generated spiral representation of the navigational path. In this embodiment, display 502 displays the complete length of the navigational path, which is difficult for a user to select a precise location. In this embodiment, display 504 displays a generated spiral representation of the navigational path associated with a user. In this embodiment, display 504 displays classified bad road as spaces within the spiral representation of the navigational path. In this embodiment, display 506 displays the generated spiral representation of the navigational path associated with a different user. In this embodiment, display 504 has two more spirals than display 506, which indicate that there are more turns for in this navigational path. In this embodiment, the program 104 raises the microfluidic layer surface, which represents the additional spirals as turns on the navigational path and represents abrasions within the spirals as classified bad road.

Figure 6:
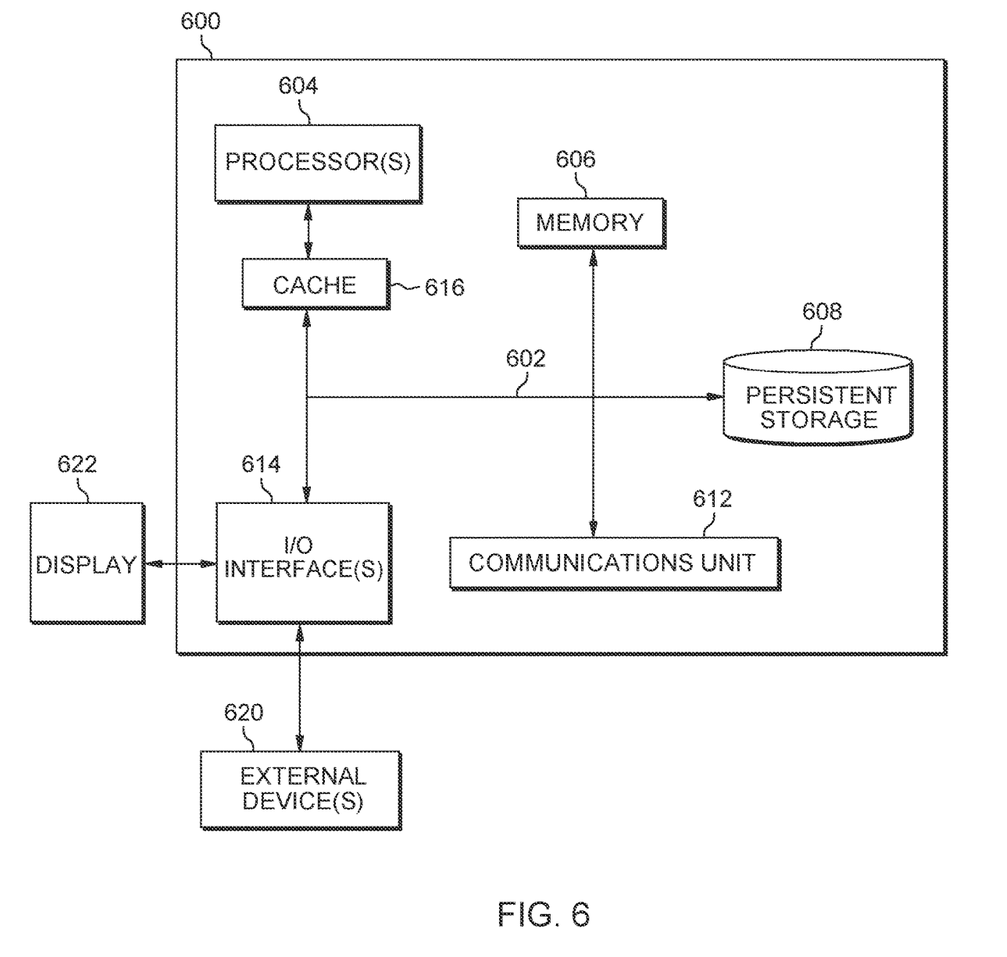
FIG. 6 depicts a block diagram of components of computing systems within a computing display environment of FIG. 1, in accordance with an embodiment of the present invention.

FIG. 6 depicts a block diagram of components of computing systems within a computing environment 100 of FIG. 1, in accordance with an embodiment of the present invention. It should be appreciated that FIG. 6 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

A computer system 600 includes a communications fabric 602, which provides communications between a cache 616, a memory 606, a persistent storage 608, a communications unit 612, and an input/output (I/O) interface(s) 614. The communications fabric 602 can be implemented with any architecture designed for passing data and/or control information between processors (such as microprocessors, communications and network processors, etc.), system memory, peripheral devices, and any other hardware components within a system. For example, the communications fabric 602 can be implemented with one or more buses or a crossbar switch.

The memory 606 and the persistent storage 608 are computer readable storage media. In this embodiment, the memory 606 includes random access memory (RAM). In general, the memory 606 can include any suitable volatile or non-volatile computer readable storage media. The cache 616 is a fast memory that enhances the performance of the computer processor(s) 604 by holding recently accessed data, and data near accessed data, from the memory 606.

The program 104 may be stored in the persistent storage 608 and in the memory 606 for execution by one or more of the respective computer processors 604 via the cache 616. In an embodiment, the persistent storage 608 includes a magnetic hard disk drive. Alternatively, or in addition to a magnetic hard disk drive, the persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by the persistent storage 608 may also be removable. For example, a removable hard drive may be used for the persistent storage 608. Other examples include optical and magnetic disks, thumb drives, and smart cards that are inserted into a drive for transfer onto another computer readable storage medium that is also part of the persistent storage 608.

The communications unit 612, in these examples, provides for communications with other data processing systems or devices. In these examples, the communications unit 612 includes one or more network interface cards. The communications unit 612 may provide communications through the use of either or both physical and wireless communications links. The program 104 may be downloaded to the persistent storage 608 through the communications unit 612.

The I/O interface(s) 614 allows for input and output of data with other devices that may be connected to a mobile device, an approval device, and/or the server computing device 108. For example, the I/O interface 614 may provide a connection to external devices 618 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., the program 104, can be stored on such portable computer readable storage media and can be loaded onto the persistent storage 608 via the I/O interface(s) 614. The I/O interface(s) 614 also connect to a display 622.

The display 622 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method (CIM) for use with a microfluidic display device that includes a flat display panel and microfluidic hardware that is configured to selectively produce raised areas on the flat display panel, the CIM comprising:
   receiving map data that represents a geographic area that includes a set of roads;
   receiving trip data that includes a starting point, a destination point and an identification of a route along the set of roads that extends from the staring point to the destination point;
   receiving road construction data including data indicative of a first road construction site along the route; and
   providing a raised spiral representation of the route on the flat display panel of the microfluidic display device with the length of the raised spiral representation being proportional to the length of the route, and with the raised spiral representation of the road including a tactile indication of the first road construction site at a scaled location, wherein the scaled location is located with respect to the length of the route so that a user is able to run a finger along the raised spiral representation to get some indication of where the first road construction site is relative to the length of the route without looking at the flat display panel.

2. A computer program product (CPP) for use with a microfluidic display device that includes a flat display panel and microfluidic hardware that is configured to selectively produce raised areas on the flat display panel, the CPP comprising:
   a set of non-transitory storage media;
   computer code stored collectively in the set of storage media, with the computer code including data and instructions for causing a processor set to perform the following operations:
      receiving map data that represents a geographic area that includes a set of roads;
      receiving trip data that includes a starting point, a destination point and an identification of a route along the set of roads that extends from the staring point to the destination point,
      receiving road construction data including data indicative of a first road construction site along the route, and
      providing a raised spiral representation of the route on the flat display panel of the microfluidic display device with the length of the raised spiral representation being proportional to the length of the route, and with the raised spiral representation of the road including a tactile indication of the first road construction site at a scaled location, wherein the scaled location is located with respect to the length of the route so that a user is able to run a finger along the raised spiral representation to get some indication of where the first road construction site is relative to the length of the route without looking at the display flat panel.

3. A computer system (CS) for use with a microfluidic display device that includes a flat display panel and microfluidic hardware that is configured to selectively produce raised areas on the flat display panel, the CS comprising:
   a processor set;
   a set of storage media;
   computer code stored collectively in the set of storage media, with the computer code including data and instructions for causing the processor set to perform the following operations:
      receiving map data that represents a geographic area that includes a set of roads;
      receiving trip data that includes a starting point, a destination point and an identification of a route along the set of roads that extends from the staring point to the destination point,
      receiving road construction data including data indicative of a first road construction site along the route, and
      providing a raised spiral representation of the route on the flat display panel of the microfluidic display device with the length of the raised spiral representation being proportional to the length of the route, and with the raised spiral representation of the road including a tactile indication of the first road construction site at a scaled location, wherein the scaled location is located with respect to the length of the route so that a user is able to run a finger along the raised spiral representation to get some indication of where the first road construction site is relative to the length of the route without looking at the display flat panel.

\* \* \* \* \*